US012334254B2

(12) United States Patent
Mimura et al.

(10) Patent No.: US 12,334,254 B2
(45) Date of Patent: Jun. 17, 2025

(54) COIL COMPONENT, CIRCUIT BOARD, AND ELECTRONIC DEVICE

(71) Applicant: TAIYO YUDEN CO., LTD., Tokyo (JP)

(72) Inventors: Daiki Mimura, Tokyo (JP); Tetsuyuki Suzuki, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 18/487,576

(22) Filed: Oct. 16, 2023

(65) Prior Publication Data

US 2024/0047110 A1 Feb. 8, 2024

Related U.S. Application Data

(63) Continuation of application No. 17/032,807, filed on Sep. 25, 2020, now Pat. No. 11,823,834.

(30) Foreign Application Priority Data

Sep. 27, 2019 (JP) ................................ 2019-178051

(51) Int. Cl.

*H01F 27/28* (2006.01)
*H01F 5/00* (2006.01)
(Continued)

(52) U.S. Cl.

CPC ......... *H01F 5/003* (2013.01); *H01F 17/0013* (2013.01); *H01F 27/255* (2013.01); *H01F 27/2804* (2013.01)

(58) Field of Classification Search

CPC .... H01F 5/003; H01F 17/0013; H01F 27/255; H01F 27/2804; H01F 41/0246;
(Continued)

(56) References Cited

U.S. PATENT DOCUMENTS

| | | | | |
|---|---|---|---|---|
| 8,723,629 | B1 | 5/2014 | Liu | |
| 2013/0222101 | A1 * | 8/2013 | Ito ............................ | H01F 3/08 336/83 |

(Continued)

FOREIGN PATENT DOCUMENTS

| | | | |
|---|---|---|---|
| CN | 107452463 | A | 12/2017 |
| JP | 2016-208002 | A | 12/2016 |
| JP | 2018-041955 | A | 3/2018 |

OTHER PUBLICATIONS

Notification of First Office Action dated Feb. 28, 2025, issued in corresponding Chinese Patent Application No. 202011021381.3 with English translation (16 pgs.).

*Primary Examiner* — Shawki S Ismail
*Assistant Examiner* — Kazi S Hossain
(74) *Attorney, Agent, or Firm* — Pillsbury Winthrop Shaw Pittman, LLP

(57) ABSTRACT

A coil component according to one aspect of the present invention includes: a magnetic base body containing a plurality of metal magnetic particles and a binder binding the plurality of metal magnetic particles together; and a coil conductor provided in the magnetic base body and including a winding portion wound around a coil axis, wherein as viewed from a direction of the coil axis, the magnetic base body includes a core region enclosed by the winding portion, and a ratio of an area of the core region to a sum of an area of the winding portion and the area of the core region is 32% or larger.

15 Claims, 8 Drawing Sheets

(51) Int. Cl.
*H01F 17/00* (2006.01)
*H01F 27/255* (2006.01)

(58) Field of Classification Search
CPC .. H01F 2017/048; H01F 17/04; H01F 27/292; H01F 27/306; H01F 27/29
USPC .................................... 336/200, 232, 83, 192
See application file for complete search history.

(56) References Cited

U.S. PATENT DOCUMENTS

| | | | | |
|---|---|---|---|---|
| 2014/0266541 | A1* | 9/2014 | Sakamoto | H01F 27/29 29/606 |
| 2016/0111195 | A1* | 4/2016 | Nishyama | H01F 17/04 336/200 |
| 2016/0314889 | A1* | 10/2016 | Ryu | H01F 41/0246 |
| 2017/0053739 | A1 | 2/2017 | Oki | |
| 2017/0345558 | A1 | 11/2017 | Sekiguchi et al. | |
| 2018/0068775 | A1 | 3/2018 | Kwon et al. | |
| 2018/0233282 | A1 | 8/2018 | Tanaka | |
| 2019/0051445 | A1* | 2/2019 | Wada | H01F 1/34 |
| 2019/0244744 | A1* | 8/2019 | Takenaka | H01F 17/045 |
| 2019/0392978 | A1 | 12/2019 | Matsuura | |
| 2020/0411232 | A1 | 12/2020 | Matsumoto | |

* cited by examiner

COIL COMPONENT, CIRCUIT BOARD, AND ELECTRONIC DEVICE

CROSS-REFERENCE TO RELATED APPLICATIONS

This application is a continuation of U.S. patent application Ser. No. 17/032,807 (filed on Sep. 25, 2020), which claims the benefit of priority from Japanese Patent Application Serial No. 2019-178051 (filed on Sep. 27, 2019), the contents of which are hereby incorporated by reference in their entirety.

TECHNICAL FIELD

The present disclosure relates to a coil component, a circuit board, and an electronic device.

BACKGROUND

Various magnetic materials have been used in coil components such as inductors. A coil component typically includes a magnetic base body made of a magnetic material, a coil conductor embedded in the magnetic base body, and external electrodes connected to ends of the coil conductor.

The magnetic base body of the coil component is made of a composite magnetic material containing a plurality of metal magnetic particles and a resin binder. Such a magnetic base body is manufactured by, for example, making a mixed resin composition by mixing and kneading metal magnetic particles and resin, pouring the mixed resin composition into a mold containing a coil conductor such that the mixed resin composition wraps the coil conductor, and applying pressure and heat to the mixed resin composition in the mold. The magnetic base body thus manufactured constitutes a closed magnetic path. In this manufacturing process, the resin contained in the mixed resin composition is cured to form the binder. In this magnetic base body, the metal magnetic particles are bound together by the binder.

Magnetic base bodies for coil components are required to have a high magnetic permeability. Efforts have been made to improve the magnetic permeability of the magnetic base bodies. For example, Japanese Patent Application Publication No. 2018-041955 discloses that a magnetic base body contains two or more types of metal magnetic particles having different average particle diameters. This can raise a filling factor of the metal magnetic particles in the magnetic base body and accordingly improve the magnetic permeability of the magnetic base body. It is disclosed in Japanese Patent Application Publication No. 2016-208002 that a magnetic base body contains three types of metal magnetic particles having different average particle diameters from each other. This can raise the filling factor of the metal magnetic particles in the magnetic base body.

The magnetic base body described above may contain voids because it is manufactured by binding the metal magnetic particles together by the binder. In addition, the resin serving as the binder absorbs water. Therefore, the magnetic base body contains water absorbed therein. When the coil component including the magnetic base body is mounted on a substrate by the reflow process, the magnetic base body containing water expands its volume due to a rapid temperature change. As a result, cracking occurs in the magnetic base body to reduce the inductance of the coil component.

SUMMARY

One object of the present invention is to overcome or relieve the above drawback. One of specific objects of the present invention is to provide a coil component capable of inhibiting reduction of inductance due to cracking in the magnetic base body. Other objects of the present invention will be made apparent through the entire description in the specification.

A coil component according to one aspect of the present invention includes: a magnetic base body containing a plurality of metal magnetic particles and a binder binding the plurality of metal magnetic particles together; and a coil conductor provided in the magnetic base body and including a winding portion wound around a coil axis, wherein as viewed from a direction of the coil axis, the magnetic base body includes a core region enclosed by the winding portion, and a ratio of an area of the core region to a sum of an area of the winding portion and the area of the core region is 32% or larger.

In one aspect, as viewed from the direction of the coil axis, a peripheral edge of the core region has no angles formed by two straight lines.

In one aspect, as viewed from the direction of the coil axis, a peripheral edge of the core region is formed of a curved line.

In one aspect, as viewed from the direction of the coil axis, the core region has a circular shape.

In one aspect, the coil component further includes at least one external electrode electrically connected to one end of the coil conductor and soldered to a substrate.

In one aspect, the magnetic base body has no cracks having a length equal to or larger than a reference length, and the reference length is three times an average particle size of the plurality of metal magnetic particles.

A circuit board according to one aspect of the present invention includes: the above coil component; and a substrate soldered to the at least one external electrode. An electronic device according to one aspect of the present invention includes the above circuit board.

Advantageous Effects

According to one aspect of the present invention, it is possible to provide a coil component capable of inhibiting reduction of inductance due to cracking in the magnetic base body.

DESCRIPTION OF THE EMBODIMENTS

Various embodiments of the present invention will be hereinafter described with reference to the accompanying drawings. Elements common to a plurality of drawings are denoted by the same reference signs throughout the plurality of drawings. For convenience of explanation, the drawings do not necessarily appear to scale.

Figure 1:
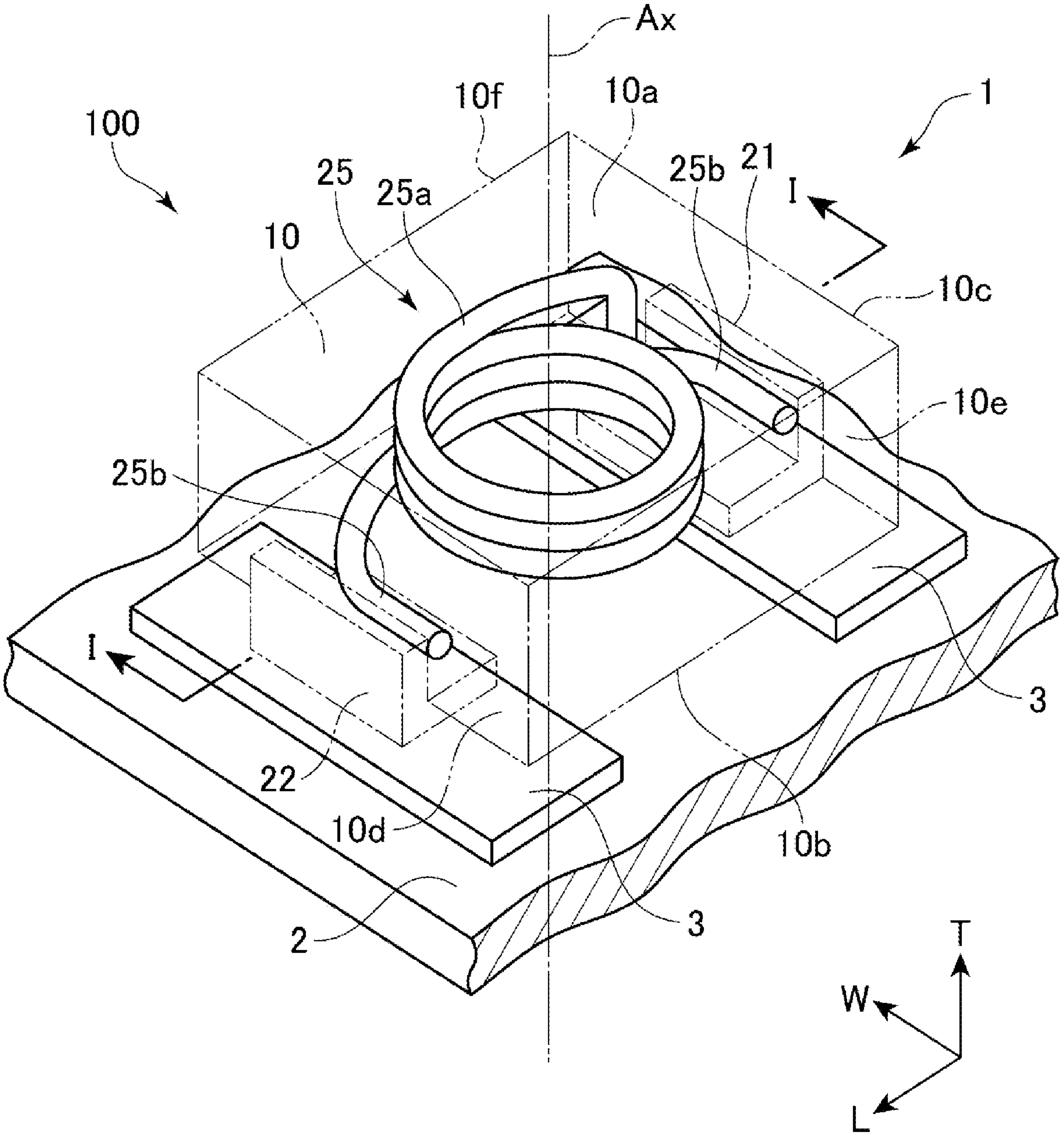
FIG. 1 is a perspective view schematically showing a circuit board according to one embodiment of the present invention.
Figure 2:
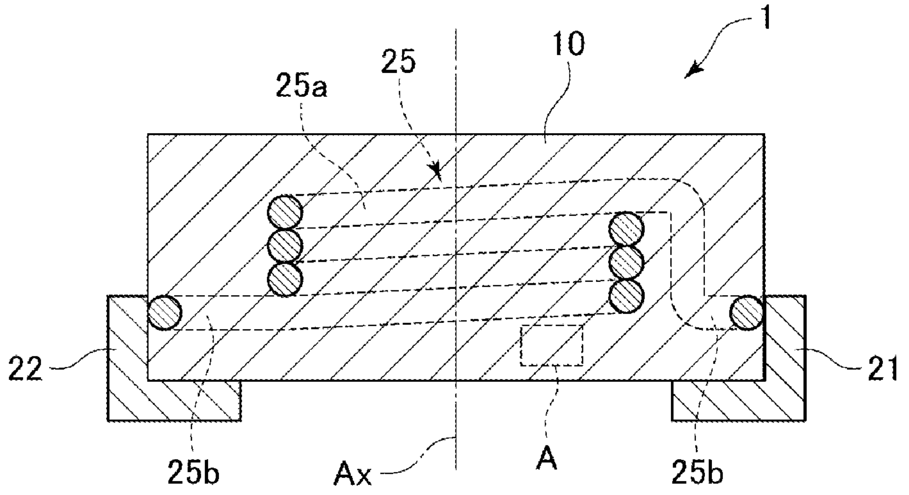
FIG. 2 is a schematic sectional view of the coil component of FIG. 1 along the line I-I.

A coil component 1 according to one embodiment of the present invention will be hereinafter described with reference to FIGS. 1 to 5. First, the coil component 1 is now briefly described with reference to FIGS. 1 and 2. FIG. 1 is a schematic perspective view of the coil component 1, and FIG. 2 schematically shows a section of the coil component 1 along the line I-I. As shown, the coil component 1 includes a magnetic base body 10, a coil conductor 25 disposed in the magnetic base body 10, an external electrode 21 disposed on the surface of the magnetic base body 10, and an external electrode 22 disposed on the surface of the magnetic base body 10 at a position spaced apart from the external electrode 21.

In this specification, a "length" direction, a "width" direction, and a "thickness" direction of the coil component 1 are referred to as an "L axis" direction, a "W axis" direction, and a "T axis" direction in FIG. 1, respectively, unless otherwise construed from the context. The "thickness" direction is also referred to as the "height" direction.

The coil component 1 is mounted on a substrate 2. The substrate 2 has two land portions 3 provided thereon. The coil component 1 is mounted on the substrate 2 by bonding the external electrodes 21, 22 to the corresponding land portions 3 of the substrate 2. The circuit board 100 includes the coil component 1 and the substrate 2. The circuit board 100 can be installed in various electronic devices. Electronic devices in which the circuit board 100 can be installed include smartphones, tablets, game consoles, and various other electronic devices.

The coil component 1 may be applied to inductors, transformers, filters, reactors, and various other coil components. The coil component 1 may also be applied to coupled inductors, choke coils, and various other magnetically coupled coil components. Applications of the coil component 1 are not limited to those explicitly described herein.

The magnetic base body 10 is made of a magnetic material and formed in a rectangular parallelepiped shape. In one embodiment of the invention, the magnetic base body 10 has a length (the dimension in the L axis direction) of 1.6 to 4.5 mm, a width (the dimension in the W axis direction) of 0.8 to 3.2 mm, and a height (the dimension in the T axis direction) of 0.8 to 5.0 mm. The dimensions of the magnetic base body 10 are not limited to those specified herein. For example, the magnetic base body 10 has a length (the dimension in the L axis direction) of 1.0 to 4.5 mm, a width (the dimension in the W axis direction) of 0.5 to 3.2 mm, and a height (the dimension in the T axis direction) of 0.5 to 5.0 mm. The length, width, and height of the magnetic base body 10 may also be smaller than the lower limits of the above respective dimensions or larger than the upper limits of the above respective dimensions. The term "rectangular parallelepiped" or "rectangular parallelepiped shape" used herein is not intended to mean solely "rectangular parallelepiped" in a mathematically strict sense.

The magnetic base body 10 has a first principal surface 10*a*, a second principal surface 10*b*, a first end surface 10*c*, a second end surface 10*d*, a first side surface 10*e*, and a second side surface 10*f*. The outer surface of the magnetic base body 10 is defined by these six surfaces. The first principal surface 10*a* and the second principal surface 10*b* are surfaces at the opposite ends in the height direction, the first end surface 10*c* and the second end surface 10*d* are surfaces at the opposite ends in the length direction, and the first side surface 10*e* and the second side surface 10*f* are surfaces at the opposite ends in the width direction.

As shown in FIG. 1, the first principal surface 10*a* lies on the top side of the magnetic base body 10, and therefore, the first principal surface 10*a* may be herein referred to as "the top surface." Similarly, the second principal surface 10*b* may be referred to as "the bottom surface." The coil component 1 is disposed such that the second principal surface 10*b* faces the substrate 2, and therefore, the second principal surface 10*b* may be herein referred to as "the mounting surface." The top-bottom direction of the coil component 1 refers to the top-bottom direction in FIG. 1.

In one embodiment of the present invention, the external electrode 21 extends on the mounting surface 10*b* and the end surface 10*c*. The external electrode 22 extends on the mounting surface 10*b* and the end surface 10*d* of the magnetic base body 10. Shapes and arrangements of the external electrodes 21, 22 are not limited to those in the example shown. The external electrodes 21 and 22 are separated from each other in the length direction.

Figure 3:
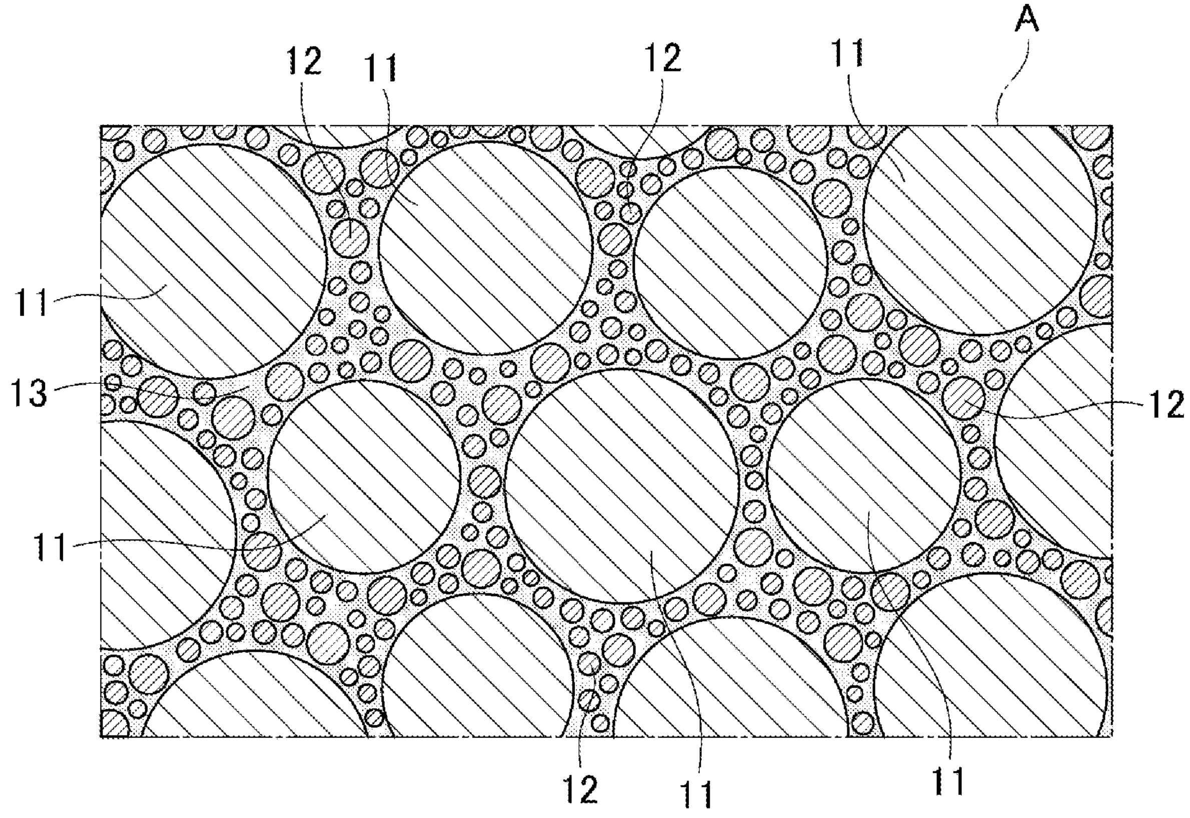
FIG. 3 is an enlarged sectional view of a magnetic base body of the coil component of FIG. 1.

Next, the magnetic base body 10 will be further described with reference to FIG. 3. FIG. 3 is an enlarged sectional view of the magnetic base body 10. FIG. 3 shows a region A of the magnetic base body 10 shown in FIG. 2. As shown in the drawing, the magnetic base body 10 contains a plurality of first metal magnetic particles 11, a plurality of second metal magnetic particles 12, and a binder 13. The binder 13 binds together the plurality of first metal magnetic particles 11 and the plurality of second metal magnetic particles 12. In other words, the magnetic base body 10 is formed of the binder 13 and the plurality of first metal magnetic particles 11 and the plurality of second metal magnetic particles 12 bound to each other by the binder 13. The region A may be any region in the magnetic base body 10.

The plurality of first metal magnetic particle 11 have a larger average particle size than the plurality of second metal magnetic particles 12. That is, the average particle size of the plurality of first metal magnetic particles 11 (hereinafter referred to as the first average particle size) is different from the average particle size of the plurality of second metal magnetic particles 12 (hereinafter referred to as the second average particle size). For example, the first average particle size is 30 μm, and the second average particle size is 0.1 μm, but these are not limitative. In one embodiment of the present invention, the magnetic base body 10 may further contain a plurality of third metal magnetic particles (not shown) having an average particle size different from the first average particle size and the second average particle size (the average particle size of the third metal magnetic particles is hereinafter referred to as the third average particle size). The third average particle size may be smaller than the first average particle size and larger than the second average particle size, or it may be smaller than the second average particle size. The first metal magnetic particles 11, the second metal magnetic particles 12, and the third metal magnetic particles contained in the magnetic base body 10 may be hereinafter collectively referred to as "the metal magnetic particles" when they need not be distinguished from one another.

The average particle size of the metal magnetic particles contained in the magnetic base body 10 is determined based on a particle size distribution. To determine the particle size distribution, the magnetic base body 10 is cut along the thickness direction (T direction) to expose a section, and the section is scanned by a scanning electron microscope (SEM) to take a photograph at a 2000 to 5000-fold magnification. The particle sizes of individual metal magnetic particles are then determined based on the photograph, and the particle size distribution is determined from the distribution of the determined particles sizes. For example, the value at 50 percent (D50) of the particle size distribution determined based on the SEM photograph can be set as the average particle size of the metal magnetic particles. The size of each particle can be determined as the diameter of a circular section of the particle based on the SEM photograph of the section when the particle is considered as a sphere. When observing metal magnetic particles with a particle diameter smaller than 1 μm, a particle size distribution may be obtained based on an SEM photograph taken at a 5000 to 10000-fold magnification.

The first metal magnetic particles 11 and the second metal magnetic particles 12 can be formed of various soft magnetic materials. For example, a main ingredient of the first metal magnetic particles 11 is Fe. Specifically, the first metal magnetic particles 11 are particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the magnetic base body 10 is not limited to those described above. The first metal magnetic particles 11 may contain, for example, 85 wt % or more Fe. This provides the magnetic base body 10 with an excellent magnetic permeability. The composition of the second metal magnetic particles 12 is either the same as or different from that of the first metal magnetic particles 11. When the magnetic base body 10 contains the plurality of third metal magnetic particles (not shown), the composition of the third metal magnetic particles is either the same as or different from that of the first metal magnetic particles 11, as with the second metal magnetic particles 12.

Figure 4:
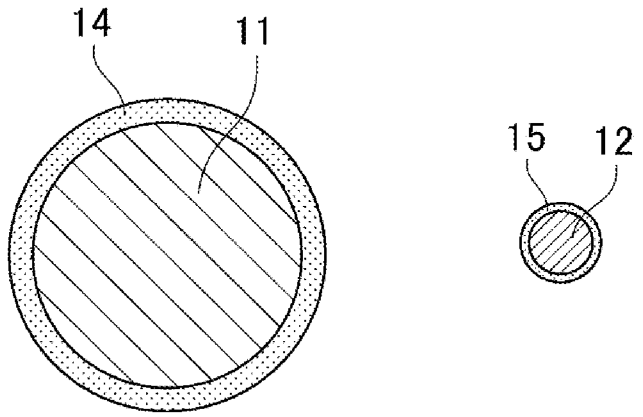
FIG. 4. schematically shows metal magnetic particles contained in the magnetic base body of the coil component of FIG. 1.

Next, the metal magnetic particles will be further described with reference to FIG. 4. FIG. 4. schematically shows the metal magnetic particles. As shown, the first metal magnetic particles 11 may be coated with an insulating film 14. The insulating film 14 is formed of glass, resin, or any other material having a high insulating property. For example, the insulting film 14 is formed on the surfaces of the first metal magnetic particles 11 by mixing the first metal magnetic particles 11 with glass powder in a friction mixer (not shown). The insulating films formed of the glass material is adhered to the surfaces of the first metal magnetic particles 11 by the compression friction action in the friction mixer. The glass material may contain ZnO and $P_2O_5$. The insulating film 14 can be formed of various glass materials. The insulating film 14 may be formed of alumina powder, zirconia powder, or any other oxide powders having a high insulating property, in place of or in addition to the glass powder. The thickness of the insulating film 14 is, for example, 100 nm or less. In the above described manner, the first metal magnetic particles 11 may have the insulating film 14 on the surface thereof.

As shown, the second metal magnetic particles 12 may be coated with an insulating film 15. The insulating film 15 may be an oxide film formed by oxidizing the second metal magnetic particles 12. The thickness of the insulating film 15 is, for example, 20 nm or less. The insulating film 15 may be an oxide film formed on the surfaces of the second metal magnetic particles 12 by performing a heat treatment on the second metal magnetic particles 12 in the atmosphere. The insulating film 15 may be an oxide film containing oxides of Fe and any other element(s) contained in the second metal magnetic particles 12. Alternatively, the insulating film 15 may be an iron phosphate film formed on the surfaces of the second metal magnetic particles 12 by introducing the second metal magnetic particles 12 in phosphoric acid and stirring them.

The binder 13 is, for example, a thermosetting resin having a high insulating property. Examples of the binder 13 include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

As shown in FIGS. 1 and 2, the coil conductor 25 includes a winding portion **25*a* and lead-out conductors 25*b*. The winding portion 25*a* is wound spirally around the coil axis Ax extending along the thickness direction (the T direction), and the lead-out conductors 25*b* lead out from opposite ends of the winding portion 25*a* to connect the opposite ends to the external electrodes 21, 22, respectively. The cross-sectional area of the coil conductor 25 (the cross-sectional area of the winding portion 25*a* and the cross-sectional area of the lead-out conductors 25*b*) is defined in accordance with the size of the coil component 1, the rated current of the coil component 1, and the inductance value required in the coil component 1. For a given size of the coil component 1 (or a given size of the magnetic base body 10), the cross-sectional area of the coil conductor 25 is defined in accordance with the rated current of the coil component 1 and the inductance value required in the coil component 1. Specifically, the lower limit of the cross-sectional area of the coil conductor 25 is defined in accordance with the rated current of the coil component 1. As the rated current of the coil component 1 is larger, the direct current resistance of the coil conductor 25 needs to be lower. Therefore, the smallest cross-sectional area of the coil conductor 25 that produces a low direct current resistance allowing the rated current to flow is the lower limit of the cross-sectional area of the coil conductor 25. On the other hand, the upper limit of the cross-sectional area of the coil conductor 25 is defined in accordance with the inductance value required in the coil component 1. Specifically, for the magnetic base body 10 having a given size, the magnetic resistance of the magnetic base body 10 is larger and thus the inductance of the coil component 1 is degraded as the cross-sectional area of the coil conductor 25 is larger. Therefore, the largest cross-sectional area of the coil conductor 25 that produces the inductance required in the coil component 1 is the upper limit of the cross-sectional area of the coil conductor 25. In this way, the cross-sectional area of the coil conductor 25 is limited by the size of the coil component 1, the rated current of the coil component 1, and the inductance value required in the coil component 1. A cross-sectional area of the coil conductor 25 between its lower limit and upper limit defined in this manner is herein referred to as "an allowable cross-sectional area" of the coil conductor 25**.

Figure 5:
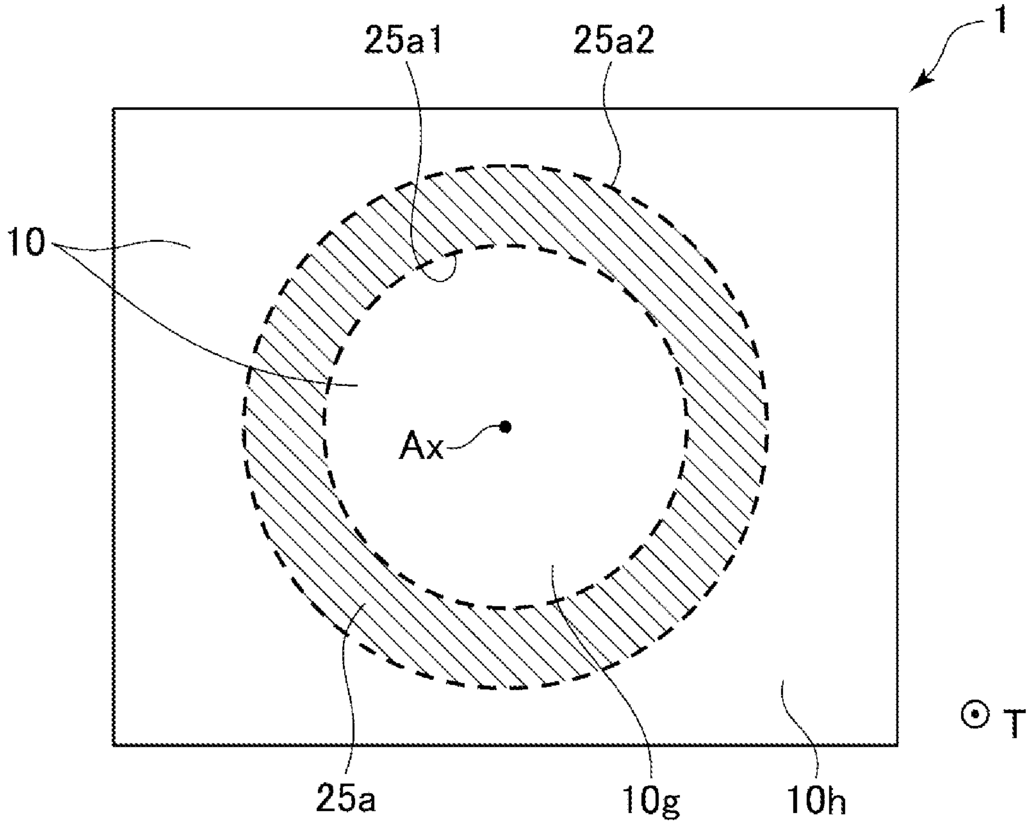
FIG. 5 is a schematic plan view of the coil component shown in FIG. 1.

FIG. 5 is a schematic view of the coil component 1 as viewed from the direction of the coil axis Ax. This schematic view shows the magnetic base body 10 and a transmission image of the winding portion 25*a* in the coil component 1 as viewed from the direction of the coil axis Ax. In FIG. 5, the lead-out conductors 25*b* of the coil conductor 25 and the external electrodes 21, 22 are not shown. As shown, the winding portion 25*a* has an inner peripheral surface 25*a*1 and an outer peripheral surface 25*a*2. In the embodiment shown, both the inner peripheral surface 25*a*1 and the outer peripheral surface 25*a*2 have a circular shape. The winding portion 25*a* has a ring-like shape as viewed from the direction of the coil axis Ax.

In the radial direction in the LW plane centered at the coil axis Ax, the inside end of the winding portion 25*a* is defined by the inner peripheral surface 25*a*1, and the outside end of the winding portion 25*a* is defined by the outer peripheral surface 25*a*2. The magnetic base body 10 includes a core region 10*g* and a margin region 10*h*. The core region 10*g* is positioned inside the winding portion 25*a* (inside the inner peripheral surface 25*a*1) as viewed from the direction of the coil axis Ax, and the margin region 10*h* is positioned outside the winding portion 25*a* (outside the outer peripheral surface 25*a*2) as viewed from the direction of the coil axis Ax. The shape of the core region 10*g* as viewed from the direction of the coil axis Ax is defined by the shape of the inner peripheral surface 25*al*. In the embodiment shown, the core region 10*g* has a circular shape as viewed from the direction of the coil axis Ax. The shape of the core region 10*g* is not limited to the circular shape. In another embodiment, the peripheral edge of the core region 10*g* is formed of a curved line only. In still another embodiment, the peripheral edge of the core region 10*g* has no angles formed by two straight lines.

Figure 6A:
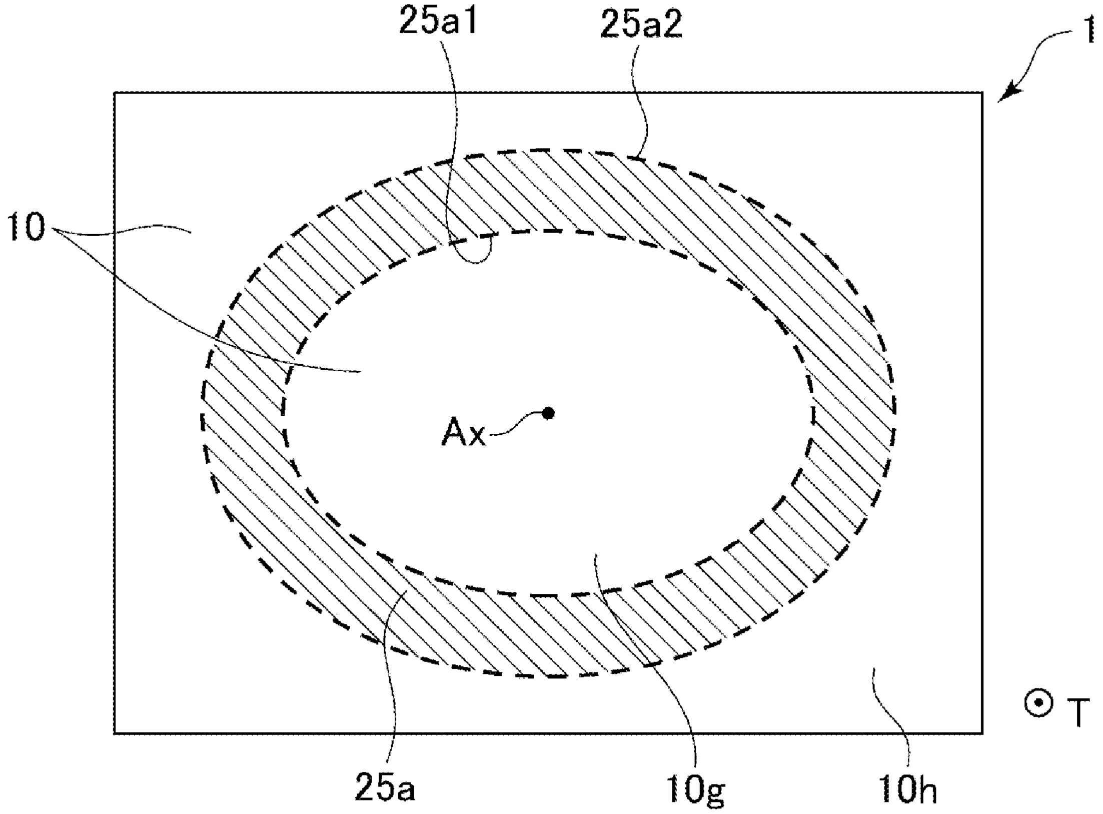
FIG. 6A is a schematic plan view of a coil component according to another embodiment of the present invention.
Figure 6B:
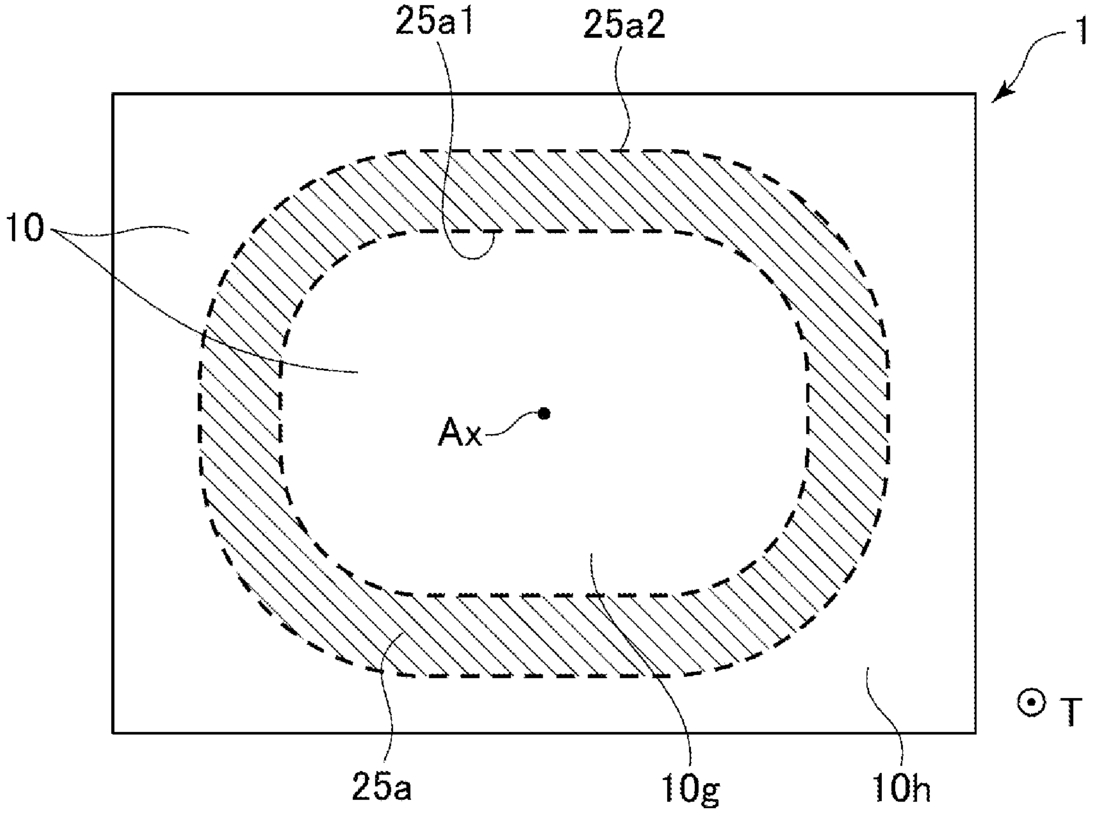
FIG. 6B is a schematic plan view of a coil component according to still another embodiment of the present invention.

The shape of the winding portion 25*a* is not limited to the example shown in FIG. 5. Specifically, although FIG. 5 shows that both the inner peripheral surface 25*a*1 and the outer peripheral surface 25*a*2 that define the shape of the winding portion 25*a* have a circular shape, the inner peripheral surface 25*a*1 and the outer peripheral surface 25*a*2 of the winding portion 25*a* may have a shape other than the circular shape. For example, as shown in FIG. 6A, the inner peripheral surface 25*a*1 and the outer peripheral surface 25*a*2 of the winding portion 25*a* may have an elliptic shape. In another embodiment, as shown in FIG. 6B, the inner peripheral surface 25*a*1 and the outer peripheral surface 25*a*2 of the winding portion 25*a* may have an oval shape. The shapes of the inner peripheral surface 25*a*1 and the outer peripheral surface 25*a*2 of the winding portion 25*a* applicable to the present invention are not limited to those explicitly described herein. For example, the inner peripheral surface 25*a*1 and the outer peripheral surface 25*a*2 of the winding portion 25*a* may have a shape without point symmetry or a shape without line symmetry.

It is supposed that the core region 10*g* has a first area S1 as viewed from the direction of the coil axis Ax, the winding portion 25*a* has a second area S2 as viewed from the direction of the coil axis Ax, and the sum of the first area S1 and the second area S2 is a third area S3. The area of the winding portion 25*a* as viewed from the direction of the coil axis Ax is defined by the allowable cross-sectional area of the coil conductor 25*a* and the cross-sectional shape of the coil conductor 25. Since the allowable cross-sectional area of the coil conductor 25 is between the lower limit and the upper limit defined as described above, the area of the winding portion 25*a* as viewed from the direction of the coil axis Ax (that is, the second area S2) is also defined within a range between a lower limit and an upper limit according to the lower limit and the upper limit of the cross-sectional area of the coil conductor 25. In view of the rated current of the coil component 1, the ratio of the first area S1 to the third area S3 (hereinafter referred to as "the area ratio r") should preferably be small. In one embodiment of the present invention, the area ratio r is 32% or larger. In other words, in one embodiment, the lower limit of the area ratio r is 32%. In view of the inductance required in the coil component 1, the area ratio r should preferably be large. In one embodiment, the upper limit of the area ratio r is 60%. In other words, in one embodiment, the area ratio r is 60% or smaller. As described above, the second area S2 is within a range between the lower limit and the upper limit defined by the rated current of the coil component 1, the inductance required in the coil component 1, and the cross-sectional shape of the coil conductor 25. In addition, a certain amount of margin is necessary between the coil conductor 25 and the outer surface of the magnetic base body 10. To satisfy these constraint conditions, the upper limit of the area ratio r is set at, for example, 60%. Further, to increase the inductance of the coil component 1, it is desirable that the first area S1 is equal or substantially equal to the area of the margin region 10*h*. The condition that the first area S1 is equal or substantially equal to the area of the margin region 10*h* may mean that the ratio of the difference between the area of the margin region 10*h* and the first area to the area of the margin region 10*h* is not more than 20%, 10%, 5%, 4%, 3%, 2%, or 1%. The upper limit of the area ratio r may be set at 50% such that the first area S1 is equal or substantially equal to the area of the margin region 10*h*.

An example of manufacturing method of the coil component 1 according to one embodiment of the invention will now be described. The following describes a method of manufacturing the coil component 1 using a compression molding process. The method of manufacturing the coil component 1 using the compression molding process includes a molding step and a heat treatment step. In the molding step, a group of particles including the plurality of first metal magnetic particles 11 and the plurality of second metal magnetic particles 12 are mixed and kneaded with a resin while being heated to produce a mixed resin composition, which is then compression-molded to form a molded body, and in the heat treatment step, the molded body obtained by the molding step is heated. In the molding step, the mixed resin composition may have added thereto a lubricant for improving mobility of the particles and a release agent for promoting separation between the mold and the molded body.

In the molding step, the coil conductor 25 prepared in advance is disposed in a molding die, and the mixed resin composition is placed into the molding die containing the coil conductor 25. A compression pressure of 500 kN to 5000 kN is then applied to the mixed resin composition in the molding die. In this way, a molded body containing the coil conductor 25 is obtained. The molding step may be performed either by warm molding or cold molding. The compression pressure may be adjusted as necessary such that the metal magnetic particles (for example, the sum of the first metal magnetic particles 11 and the second metal magnetic particles 12) in the magnetic base body 10 of a finished coil component 1 has a desired filling factor. In one embodiment, the desired filling factor of the metal magnetic particles in the magnetic base body 10 of a finished coil component 1 is 85 vol % or higher. The desired filling factor of the metal magnetic particles in the magnetic base body 10 of a finished coil component 1 may be 87 vol % or higher.

The filling factor of the metal magnetic particles in the magnetic base body 10 of a finished coil component 1 may be higher inside the coil conductor 25 than outside the same.

After the molded body is obtained through the molding step, the manufacturing method proceeds to the heat treatment step. In the heat treatment step, heat treatment is performed on the molded body obtained in the molding step to produce the magnetic base body 10 containing the coil conductor 25. By this heat treatment, the resin in the mixed resin composition is cured to form the binder 13, and the binder 13 binds together the plurality of first metal magnetic particles 11 and the plurality of second metal magnetic particles 12. The heat treatment is performed at a curing temperature of the resin in the mixed resin composition, for example, at a temperature from 150° C. to 200° C. for a duration of 30 minutes to 240 minutes. The heat treatment step may include degreasing of the molded body obtained in the molding step. Alternatively, degreasing may be independently performed from the heat treatment step.

Next, a conductor paste is applied to both end portions of the magnetic base body 10, which is produced in the above-described manner, to form the external electrode 21 and the external electrode 22. The external electrode 21 and the external electrode 22 are provided such that they are electrically coupled to corresponding ends of the coil conductor 25 provided in the magnetic base body 10. The external electrodes 21, 22 may include a plating layer. There may be two or more plating layers. The two plating layers may include an Ni plating layer and an Sn plating layer externally provided on the Ni plating layer. The coil component 1 is manufactured in this manner.

The coil component 1 manufactured is mounted on the substrate 2 by a reflow process. In this process, the substrate 2 having the coil component 1 positioned thereon passes at a high speed through a reflow furnace heated to, for example, a peak temperature of 260° C., and then the external electrodes 21, 22 are soldered to the corresponding land portions 3 of the substrate 2. In this way, the coil component 1 is mounted on the substrate 2, and thus the circuit board 100 is manufactured.

Figure 7:
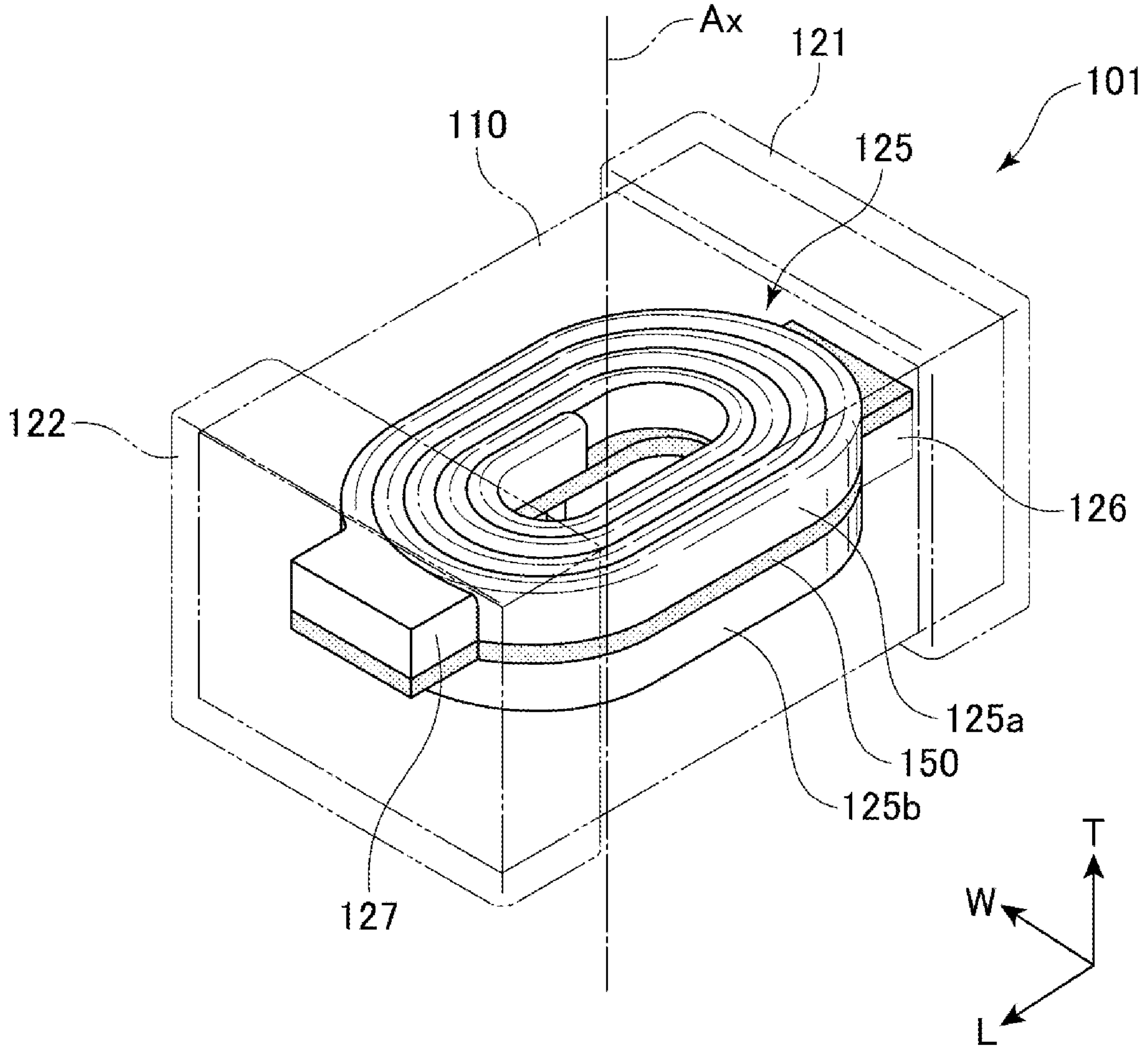
FIG. 7 is a perspective view of the coil component according to another embodiment of the present invention.

The following describes a coil component 101 according to another embodiment of the invention with reference to FIG. 7. The coil component 101 is a planar coil. As shown, the coil component 101 includes a magnetic base body 110, an insulating plate 150 provided in the magnetic base body 110, a coil conductor 125 provided on upper and lower surfaces of the insulating plate 150 in the magnetic base 110, an external electrode 121 provided on the magnetic base body 110, and an external electrode 122 provided on the magnetic base body 110 at a position spaced apart from the external electrode 121.

Similarly to the magnetic base body 10, the magnetic base body 110 includes the plurality of first metal magnetic particles 11, the plurality of second metal magnetic particles 12, and the binder 13. The insulating plate 150 is made of an insulating material and has a plate-like shape. The insulating material used for the insulating plate 150 may be magnetic. The magnetic material used for the insulating plate 150 is, for example, a composite magnetic material containing a binder 13 and metal magnetic particles.

The coil conductor 125 includes a coil conductor 125*a* formed on the top surface of the insulating plate 150 and a coil conductor 125*b* formed on the bottom surface of the insulating plate 150. The coil conductor 125*a* and the coil conductor 125*b* are connected to each other through a via (not shown). The coil conductor 125*a* is formed in a predetermined pattern on the top surface of the insulating plate 150, and the coil conductor 125*b* is formed in a predetermined pattern on the bottom surface of the insulating plate 150. An insulating film may be provided on surfaces of the coil conductors 125*a*, 125*b*. The coil conductor 125 can be provided in various shapes. When seen from above, the coil conductor 125 has, for example, a spiral shape, a meander shape, a linear shape or a combined shape of these. The coil conductor 125 corresponds to the winding portion wound around the coil axis Ax, as in one embodiment of the present invention. Unlike the winding portion 25*a* of one embodiment of the present invention, the coil conductor 125 has an oval shape.

In still another embodiment of the invention, the insulating plate 150 has a larger resistance than the magnetic base body 110. Thus, even when the insulating plate 150 has a small thickness, electric insulation between the coil conductor 125*a* and the coil conductor 125*b* can be ensured.

A lead-out conductor 127 is provided on one end of the coil conductor 125*a*, and a lead-out conductor 126 is provided on one end of the coil conductor 125*b*. In this manner, the coil conductor 125 is electrically coupled to the external electrode 121 via the lead-out conductor 126 and is electrically coupled to the external electrode 122 via the lead-out conductor 127.

As with the coil component 1, the area ratio r of the coil component 101 is 32% or larger.

Next, a description is given of an example of a manufacturing method of the coil component 101. To start with, an insulating plate made of a magnetic material and shaped like a plate is prepared. Next, a photoresist is applied to the top surface and the bottom surface of the insulating plate, and then conductor patterns are transferred onto the top surface and the bottom surface of the insulating plate by exposure, and development is performed. As a result, a resist having an opening pattern for forming a coil conductor is formed on each of the top surface and the bottom surface of the insulating plate. For example, the conductor pattern formed on the top surface of the insulating plate corresponds to the coil conductor 125*a* described above, and the conductor pattern formed on the bottom surface of the insulating plate corresponds to the coil conductor 125*b* described above. A through-hole for the via is formed in the insulating plate.

Subsequently, plating is performed to fill each of the opening patterns with a conductive metal. Next, etching is performed to remove the resists from the insulating plate, so that the coil conductors are formed on the top surface and the bottom surface of the insulating plate. Further, the through-hole in the insulating plate is filled with a conductive metal to form the via that connects the coil conductor 125*a* and the coil conductor 125*b*.

A magnetic base body is subsequently formed on both surfaces of the insulating plate having the coil conductors formed thereon. This magnetic base body corresponds to the magnetic base body 110 described above. To form the magnetic base body, magnetic sheets are first fabricated. A magnetic sheet is fabricated by mixing and kneading a group of particles including the metal magnetic particles 11 and the metal magnetic particles 12 with a resin while heating them to form a mixed resin composition, placing the mixed resin composition into a sheet-shaped molding die, and then cooling the mixed resin composition in the sheet-shaped mold. After a pair of magnetic sheets are fabricated in this manner, these magnetic sheets and the coil conductor placed between the magnetic sheets are pressurized with heat to form a laminated body. Next, the laminated body is subjected to heat treatment at the curing temperature of the resin, for example, at a temperature of 150° C. to 200° C. for a duration of 30 minutes to 240 minutes. In this way, the magnetic base body 110 containing the coil conductor 125 can be obtained. In the magnetic base body 110, the resin in the mixed resin composition is cured to form the binder 13. The binder 13 binds together the plurality of first metal magnetic particles 11 and the plurality of second metal magnetic particles 12 contained in the mixed resin composition. External electrodes 121, 122 are provided on the external surface of the magnetic base body 110 at predetermined positions. In this manner, the coil component 101 is manufactured.

EXAMPLES

Next, examples will now be described. First, four types of coil conductors were prepared. These four types of coil conductors were so fabricated as to have such shapes that the area ratios r of finished coil components as viewed from the direction of the coil axis Ax are 28%, 30%, 32%, and 35%. Next, these four types of coil conductors were used to prepare four types of coil component samples (samples 1 to 4) by a compression molding process. Specifically, each of these samples was prepared as follows. First, the first metal magnetic particles having an average particle size of 30 μm and the second metal magnetic particles having an average particle size of 0.1 μm were mixed and kneaded with an epoxy resin to form a mixed resin composition. The mixed resin composition was placed into a molding die containing one of the coil conductors, and the mixed resin composition placed into the molding die was compression-molded with a molding pressure of 500 kN to form a molded body. The first metal magnetic particles and the second metal magnetic particles were Fe—Si—Cr alloy particles. Next, the molded body was heat-treated at 200° C. to obtain a magnetic base body. Next, a conductor paste was applied to both end portions of the magnetic base body obtained in the above-described manner to form external electrodes. The inductance of samples 1 to 4 was measured by an LQR meter.

Samples 1 to 4 fabricated as described above were subjected to a reflow pressure test as follows. First, the samples were left for 168 hours in a test bath in an environment retained at a temperature of 85° C. and a humidity of 85%, thereby letting the samples absorb moisture. Next, the samples having absorbed moisture was passed through a reflow furnace at a peak temperature of 260° C. These test conditions correspond to Level 1 Test Conditions prescribed under the MSL (Moisture Sensitivity Level) standard of JEDEC (Joint Electron Device Engineering Council). The inductance of samples 1 to 4 having been passed through the reflow furnace was measured again. Next, the change ratio (the L change ratio) of inductance was determined for each of samples 1 to 4 using the inductance measured after the reflow pressure test and the inductance measured before the reflow pressure test. The L change ratio refers to the reduction ratio of the inductance of the coil component after the reflow pressure test to the inductance before the reflow pressure test.

Figure 8:
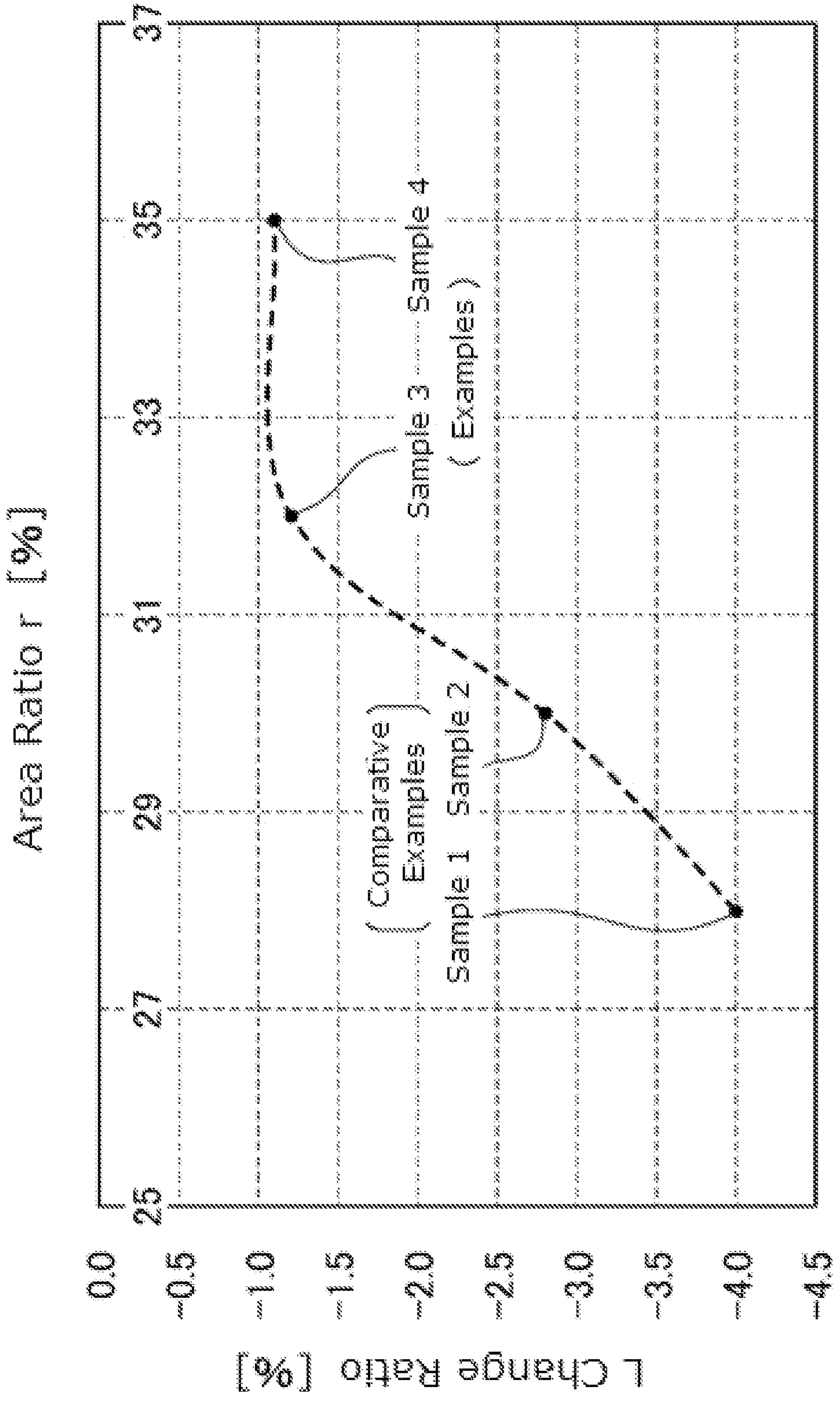
FIG. 8 is a graph showing a relationship between an area ratio and a rate of change of an inductance property.

The relationship between the area ratio r and the L change ratio was plotted for each sample to draw the graph shown in FIG. 8. In the graph of FIG. 8, the horizontal axis refers to the area ratio r, and the vertical axis refers to the L change ratio. As shown in this graph, the L change ratios of samples 1 to 4 were −4.0%, −2.8%, −1.2%, and −1.1%, respectively. Samples with the L change ratio equal to or smaller than −2.0% were regarded as good articles. As a result, samples 3 and 4 were good articles, and samples 1 and 2 were defective articles. The reflow conditions of the reflow process in this reflow pressure test are temperature and environmental conditions more severe than the reflow conditions in the actual reflow process for typical substrate mounting. During the reflow process in this reflow pressure test, many of typical conventional coil components experience 4.0% or higher reduction of inductance through the reflow pressure test. For the coil components experiencing the L change ratio of 2.0% or smaller through the reflow pressure test, the change ratio of inductance in the reflow pressure test is smaller than the change ratio of inductance of conventional coil components, which confirms excellent inductance after these coil components are actually mounted on the substrate by the reflow mounting process.

For each of samples 1 to 4, the external electrodes were removed to expose the magnetic base body, and a sectional surface of the magnetic base body was observed to examined as to whether it is cracked. In each sample, the coil conductor 25 and the magnetic base body 10 are expanded and contracted in accordance with different coefficients of linear expansion due to a rapid temperature change during the reflow process in the reflow pressure test. During the reflow process in the reflow pressure test, the moisture absorbed into the magnetic base body 10 of each sample in the high humidity environment of the reflow pressure test evaporates. As a result, in each sample, the portion of the magnetic base body 10 corresponding to the core region 10*g* receives a compressive stress from the winding portion 25*a*, which causes cracking in the magnetic base body 10. The observation of cracking was performed as follows. First, the magnetic base body of each of samples 1 to 4 was cut along a cutting surface including the coil axis Ax and thus along the thickness direction thereof (the T direction) to expose a sectional surface. The region of the sectional surface inside the winding portion 25*a* (the region corresponding to the core region 10*g*) was observed under an optical microscope at a 500-fold magnification to determine whether an observation region of 300 μm by 300 μm includes a microcrack or a normal crack. In this observation, a microcrack was defined as a crack having a length less than a reference length corresponding to three times the size of the first metal magnetic particles (having an average particle size of 30 μm) (that is, the distance three times as large as the diameter of the first metal magnetic particles 11) contained in the magnetic base body, and a normal crack was defined as a crack having a length equal to or greater than the reference length. It is presumed that a normal crack occurs when a plurality of microcracks are connected together. Each sample was observed at five observation regions to determine whether the observation regions include a microcrack or a normal crack.

Figure 9:
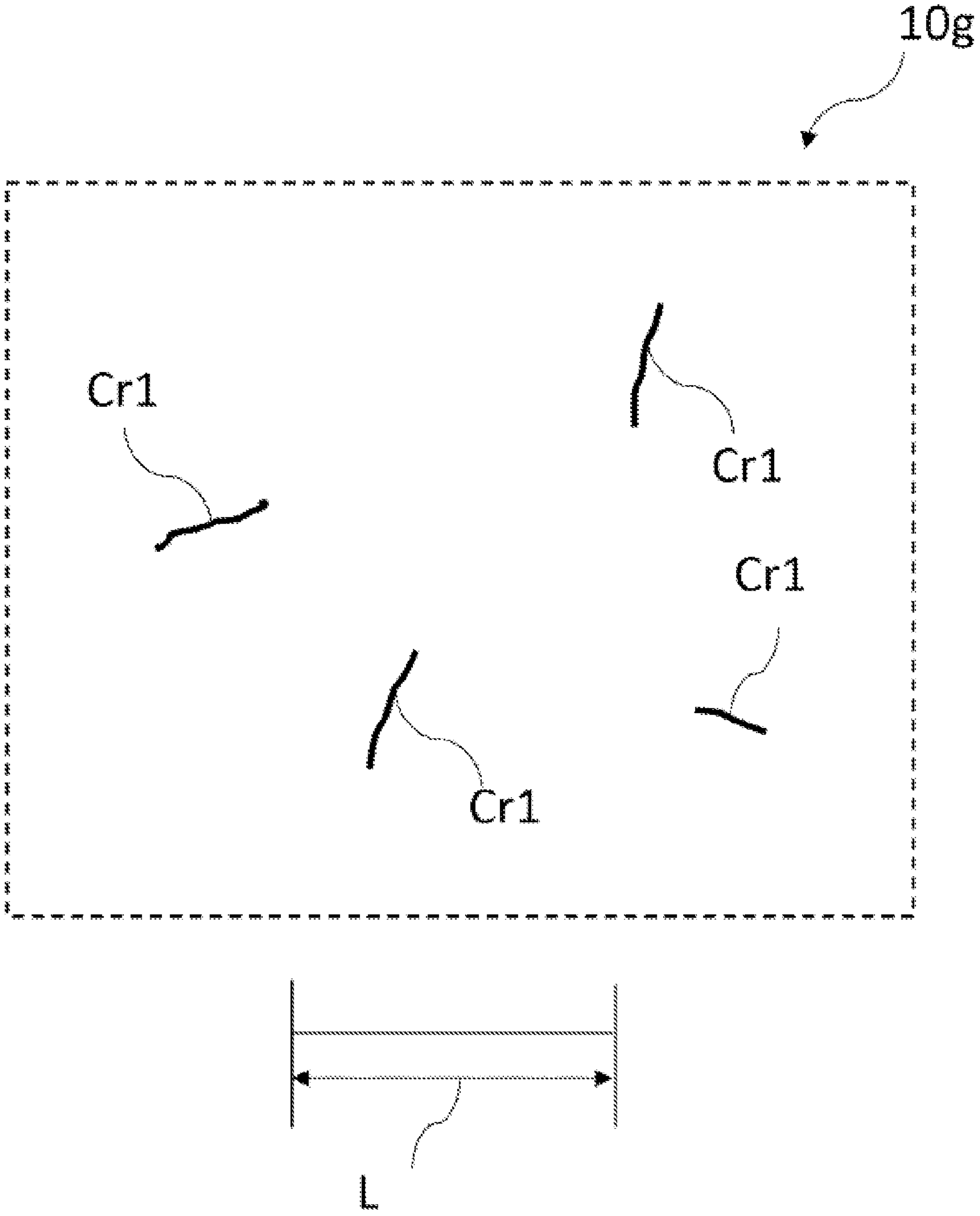
FIG. 9 is an enlarged sectional view of a magnetic base body of the coil component.

As a result of this observation, for samples 3 and 4, microcracks Cr1 were observed but no normal cracks were observed in each of the respective five observation regions, as shown in FIG. 9. By contrast, for samples 1 and 2, one or more normal cracks were observed in addition to microcracks Cr1 in each of the respective five observation regions. In samples 3 and 4, since the area of the core region 10*g* is relatively large, a plurality of microcracks Cr1 are less likely to connect with one another than in samples 1 and 2 in which the area of the core region 10*g* is relatively small. Therefore, normal cracks are less prone to occur.

For samples 3 and 4 as examples, it is presumed that the magnetic path length was large since the magnetic flux had to bypass the microcracks Cr1 formed in the core region 10*g*, but the L change ratio was kept low. By contrast, for samples 1 and 2 as comparative examples, it is presumed that since the magnetic flux had to pass through the normal cracks formed in the core region 10*g*, effective permeability was reduced, leading to the large L change ratio.

Advantageous effects of the above embodiments will now be described. In one embodiment of the present invention, the area ratio r is 32% or larger. Therefore, the coil components 1, 101 according to one embodiment of the present invention is less prone to have normal cracks formed in the portion corresponding to the core region 10*g* in the magnetic base body 10 due to an impact of the reflow process in the reflow pressure test, as compared to embodiments in which the area ratio r is less than 32% (hereinafter referred to as the first comparative embodiment). Thus, it possible to inhibit reduction of inductance in the coil components 1, 101 of the above embodiments.

According to the above embodiments, the inner peripheral surface 25*a*1 of the winding portion 25*a* as viewed from the direction of the coil axis Ax has a circular shape. This prevents a compressive stress from acting from the winding portion 25*a* onto the core region 10*g* in a concentrated manner. Likewise, in the embodiment in which the inner peripheral surface 25*a*1 of the winding portion 25*a* has no angles formed by two straight lines and the embodiment in which the inner peripheral surface 25*a*1 is formed of a curved line only, it is also possible to prevent a compressive stress from acting on the core region 10*g* in a concentrated manner. Accordingly, in the above embodiments, cracking can be inhibited. As a result, in the above embodiment, normal cracks can also be inhibited from occurring, and therefore, reduction of inductance caused by normal cracks can be inhibited.

In the above embodiments, since reduction of inductance is inhibited, a desired value of inductance can be obtained in the coil components 1, 101 even with a smaller number of turns of the coil conductors 25, 125. Therefore, the direct current resistance (Rdc) of the coil conductors 25, 125 can be reduced.

The dimensions, materials, and arrangements of the constituent elements described for the above various embodiments are not limited to those explicitly described for the embodiments, and these constituent elements can be modified to have any dimensions, materials, and arrangements within the scope of the present invention. Furthermore, constituent elements not explicitly described herein can also be added to the above-described embodiments, and it is also possible to omit some of the constituent elements described for the embodiments.

What is claimed is:

1. A coil component comprising:

a magnetic base body containing a plurality of metal magnetic particles and a binder containing a thermosetting resin;

an insulating plate; and a coil conductor provided in the magnetic base body and including a winding portion wound around a coil axis, the coil conductor containing an upper coil element and a lower coil element, the upper coil element being provided on an upper surface of the insulating plate, the lower coil element being provided on a lower surface of the insulating plate, wherein as viewed from a direction of the coil axis, the magnetic base body includes a core region enclosed by the winding portion, and wherein as viewed from the direction of the coil axis, a ratio of an area of the core region to a sum of an area of the winding portion and the area of the core region is within a range from 32% to 60%.

2. The coil component of claim 1, wherein as viewed from the direction of the coil axis, a peripheral edge of the core region has no angles formed by two straight lines.

3. The coil component of claim 1, wherein as viewed from the direction of the coil axis, a peripheral edge of the core region is formed of a curved line.

4. The coil component of claim 3, wherein as viewed from the direction of the coil axis, the core region has a circular shape.

5. The coil component of claim 1, further comprising at least one external electrode electrically connected to one end of the coil conductor and soldered to a substrate.

6. The coil component of claim 1, wherein the magnetic base body has no cracks having a length equal to or larger than a reference length, and the reference length is three times an average particle size of the plurality of metal magnetic particles.

7. The coil component of claim 5, wherein the magnetic base body has a mounting surface extending in one axial direction perpendicular to the coil axis, wherein the at least one external electrode comprises a first external electrode and a second external electrode, wherein the first external electrode and the second external electrode are provided on the mounting surface and separated from each other in the one axial direction, and wherein a dimension of the mounting surface in the one axial direction is 4.5 mm or smaller.

8. A circuit board comprising:

the coil component of claim 1, and a substrate soldered to at least one external electrode of the coil component.

9. An electronic device comprising the circuit board of claim 8.

10. The coil component of claim 1, wherein the ratio is within a range from 32% to 50%.

11. The coil component of claim 10, wherein the ratio is within a range from 32% to 35%.

12. The coil component of claim 7, wherein the dimension of the mounting surface in the one axial direction is within a range from 1.0 mm to 4.5 mm.

13. The coil component of claim 7, wherein the dimension of the mounting surface in the one axial direction is within a range from 1.6 mm to 4.5 mm.

14. The coil component of claim 1, wherein the insulating plate is formed of a magnetic material.

15. The coil component of claim 1, wherein the insulating plate has a larger resistance than the magnetic base body.

* * * * *